US012023908B2

(12) United States Patent
Mayr et al.

(10) Patent No.: US 12,023,908 B2
(45) Date of Patent: Jul. 2, 2024

(54) DRYING UNIT FOR A PRINTING DEVICE FOR PRINTING WITH INK TO A RECORDING MEDIUM IN THE FORM OF A WEB

(71) Applicant: Canon Production Printing Holding B.V., Venlo (NL)

(72) Inventors: Stefan Mayr, Reichertshausen (DE); Mehrad Biglari, Munich (DE); Stephan Pilsl, Rohrmoos (DE)

(73) Assignee: Canon Production Printing Holding B.V., Venlo (NL)

( * ) Notice: Subject to any disclaimer, the term of this patent is extended or adjusted under 35 U.S.C. 154(b) by 194 days.

(21) Appl. No.: 17/703,530

(22) Filed: Mar. 24, 2022

(65) Prior Publication Data

US 2022/0305810 A1 Sep. 29, 2022

(30) Foreign Application Priority Data

Mar. 25, 2021 (DE) ..................... 10 2021 107 462.2

(51) Int. Cl.
*B41J 11/00* (2006.01)

(52) U.S. Cl.
CPC .................................. *B41J 11/002* (2013.01)

(58) Field of Classification Search
CPC ...... B41J 11/002; B41J 11/0024; B41J 15/04; B41J 11/00216
See application file for complete search history.

(56) References Cited

U.S. PATENT DOCUMENTS

| | | | | |
|---|---|---|---|---|
| 6,246,856 | B1 | 6/2001 | Kopp et al. | |
| 10,518,558 | B1 | 12/2019 | Izawa et al. | |
| 2015/0298469 | A1 * | 10/2015 | Seki | B41J 11/00216 347/102 |
| 2017/0087878 | A1 | 3/2017 | Mark et al. | |

FOREIGN PATENT DOCUMENTS

| | | | | |
|---|---|---|---|---|
| DE | 102013106211 | A1 * | 12/2014 | B41J 15/04 |
| DE | 102013106211 | B4 | 5/2015 | |
| DE | 102015218316 | A1 | 3/2017 | |
| WO | 9839691 | A1 | 9/1998 | |

OTHER PUBLICATIONS

Office Action issued in DE102021107462.2 dated Jan. 18, 2022.

* cited by examiner

*Primary Examiner* — Bradley W Thies
(74) *Attorney, Agent, or Firm* — The Webb Law Firm

(57) ABSTRACT

A drying unit for a printing device for printing with ink to a recording medium in the form of a web includes at least one heating element. The recording medium to be dried is movable along an emission region of the heating element. The emission region is arranged angled in the transport direction of the recording medium.

19 Claims, 5 Drawing Sheets

DRYING UNIT FOR A PRINTING DEVICE FOR PRINTING WITH INK TO A RECORDING MEDIUM IN THE FORM OF A WEB

CROSS-REFERENCE TO RELATED APPLICATION

This application claims priority to German Patent Application No. 10 2021 107 462.2 filed Mar. 25, 2021, the disclosure of which is hereby incorporated by reference in its entirety.

BACKGROUND

Field

The disclosure relates to a drying unit for a printing device for printing with ink to a recording medium in the form of a web, which comprises at least one heating element. The recording medium to be dried is movable along an emission region of the heating element. The disclosure also relates to an inkjet printing device for printing with ink to a recording medium in the form of a web, which comprises such a drying unit.

Related Art

A printing device for printing with ink to a recording medium in the form of a web is known from the document DE 10 2013 106 211 B4, for example.

From the document WO 98/39691A1, a printing or copying apparatus is known for printing to a recording medium in the form of a web, in which apparatus a plurality of modules and assemblies are provided. The printing or copying apparatus thus has, on both sides of a transport channel, an electrophotography module and a respective transfer module, as well as a downstream fixing module.

Given a modular design, however, the individual modules require a relatively large amount of installation space, in particular drying units of inkjet printing devices.

SUMMARY

The disclosure is based on the object of specifying a drying unit for an inkjet printing device that is simple to design and requires only a relatively small installation space.

This object is achieved via a drying unit as described herein.

Via a drying unit as described herein, it is achieved that installation space may be optimally utilized via an inclined or oblique arrangement of the emission region. What is understood by an inclined or oblique arrangement of the emission region is that the emission region is arranged neither vertically nor horizontally, but rather preferably in an inclined plane. In the transport direction of the recording medium, the emission region thus has a different height at the start of the emission region than at the end of the emission region. The emission region of a heating element is, in general, the plane in which the heating element emits thermal radiation, or in which a contact region is arranged for contacting a heating element with the recording medium to be printed, said heating element being executed as a contact heating element.

The contact region of a contact heating element is preferably formed by a heating saddle across which the recording medium is guided. Given a radiant heating element, the recording medium is preferably directed past the emission region at a defined distance.

The recording medium is preferably first directed downward at an angle on the front side of the drying unit, and is subsequently directed upward at an angle on the back side of the drying unit. The at least one heating element is arranged on the front side of the drying unit. A further heating element and/or a cooling element may be arranged on the back side of the drying unit.

A second aspect relates to an inkjet printing device for printing ink to a recording medium in the form of a web, which inkjet printing device comprises a drying unit as described herein.

BRIEF DESCRIPTION OF THE DRAWINGS

Further features and advantages result from the subsequent description, which explains the embodiments in detail using attached Figures. Shown are.

DETAILED DESCRIPTION

Figure 1:
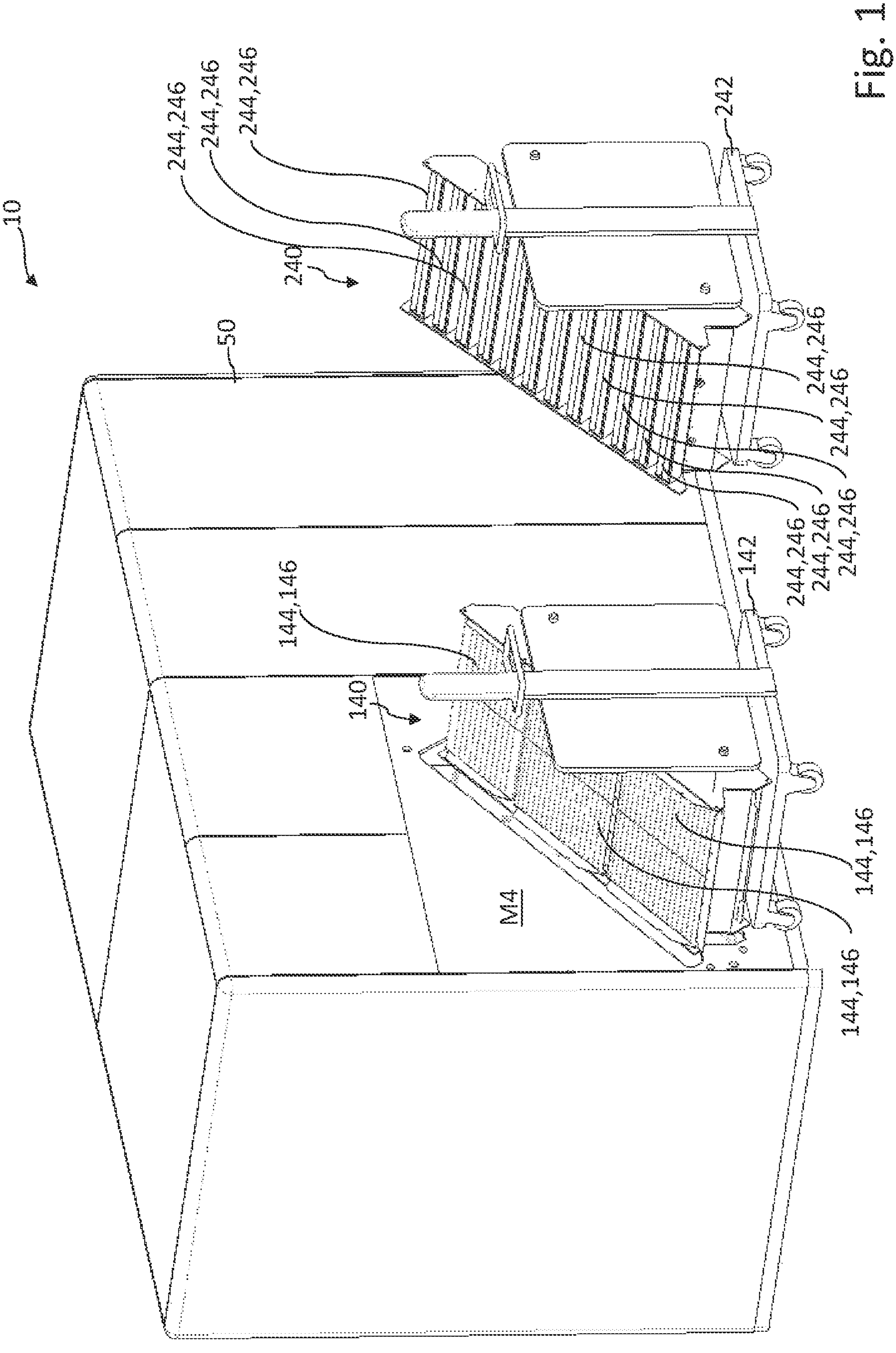
FIG. 1 is a perspective view of an inkjet printing device for printing with ink to a recording medium in the form of a web, having two alternatively usable drying units of a drying module.

FIG. 1 shows a perspective view of an inkjet printing device 10 for printing with ink to a recording medium in the form of a web, with two drying units 140, 240 of a drying module M4 that are alternatively usable in the inkjet printing device 10. The inkjet printing device 10 is in particular a high-capacity printer that may print at high speed, typically up to 3 m/s, in multicolor operation to the recording medium 12 depicted in FIG. 4. Paper; packaging material; textile material; cardboard; films of plastic and/or metal; or hybrid material such as, for example plastic or metal regions in paper may be provided as recording medium 12.

A housing 50 of the inkjet printing device 10 is opened in the region of the drying module M4 so that, for example, the drying unit 140 may be removed from the drying module M4 and deposited on a transport cart 142 and another drying unit 240 may be inserted into the drying module M4, or vice versa. The drying unit 140 comprises contact heating elements 144 that preferably comprise a heating saddle across which the recording medium, preferably in the form of a web, is guided so that this contacts the surface of the heating saddle. The heating elements 144 are arranged on the front side of the drying unit 140, which is angled obliquely downward in the transport direction of the recording medium. At least one further contact heating element 144 and/or at least one cooling element to cool the recording medium may be arranged on the back side of the drying unit 140, past which the recording medium is subsequently directed sloping upward. The drying unit 240 comprises at least one radiant heating element 244, in particular an IR radiant heating element 244, past which the recording medium is directed to dry the ink applied upon printing. In the drying unit 240 as well, the heating elements 244 are also arranged on the front side of the drying unit 240, which front side is inclined downward in the transport direction of the recording medium. At least one further radiant heating element 244 and/or at least one cooling element to cool the recording medium may be arranged on the back side of the drying unit 240, past which the recording medium is subsequently directed at an upward inclination.

Figure 2:
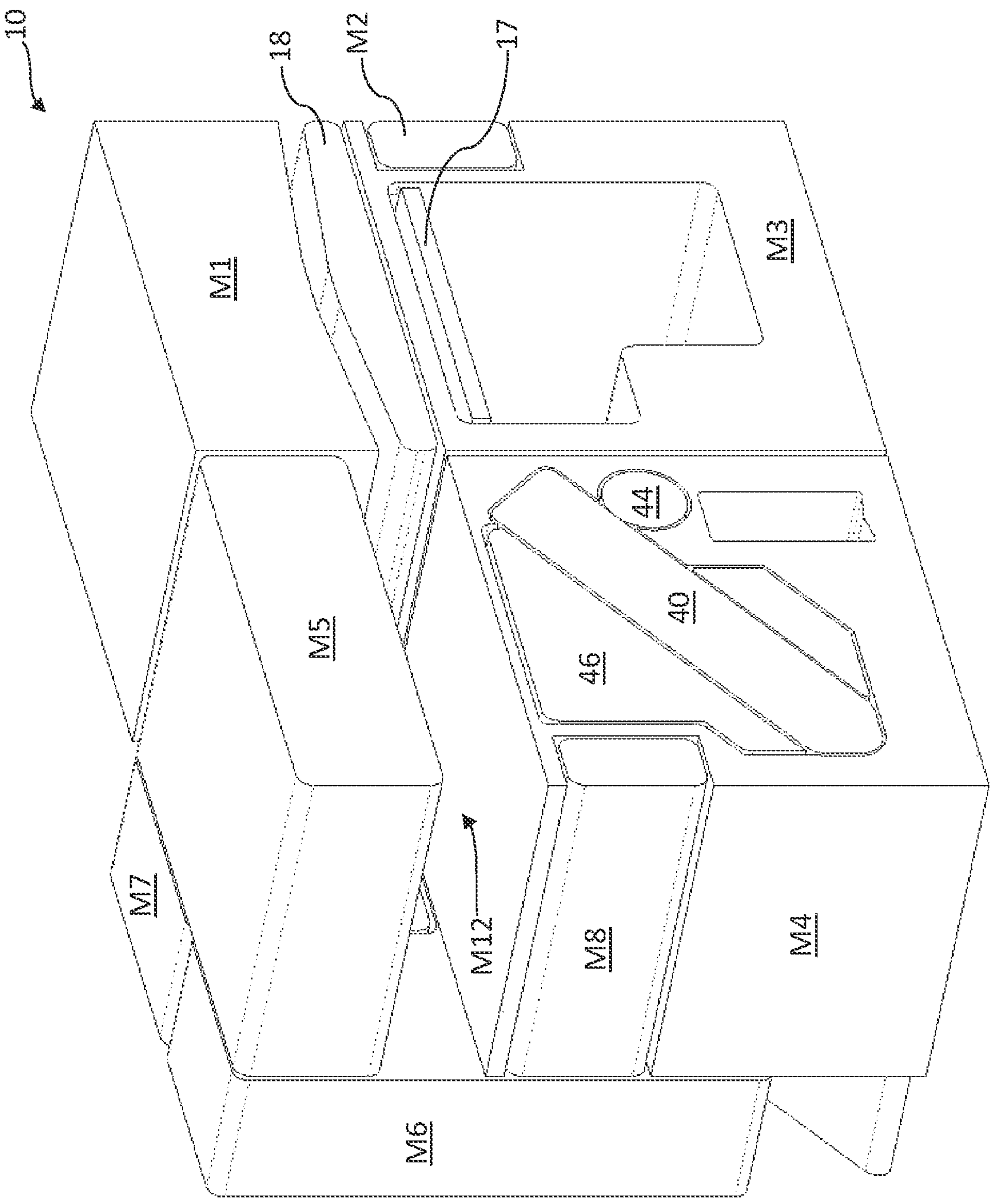
FIG. 2 is a schematic view of modules of the inkjet printing device according to FIG. 1, from a first perspective.
Figure 3:
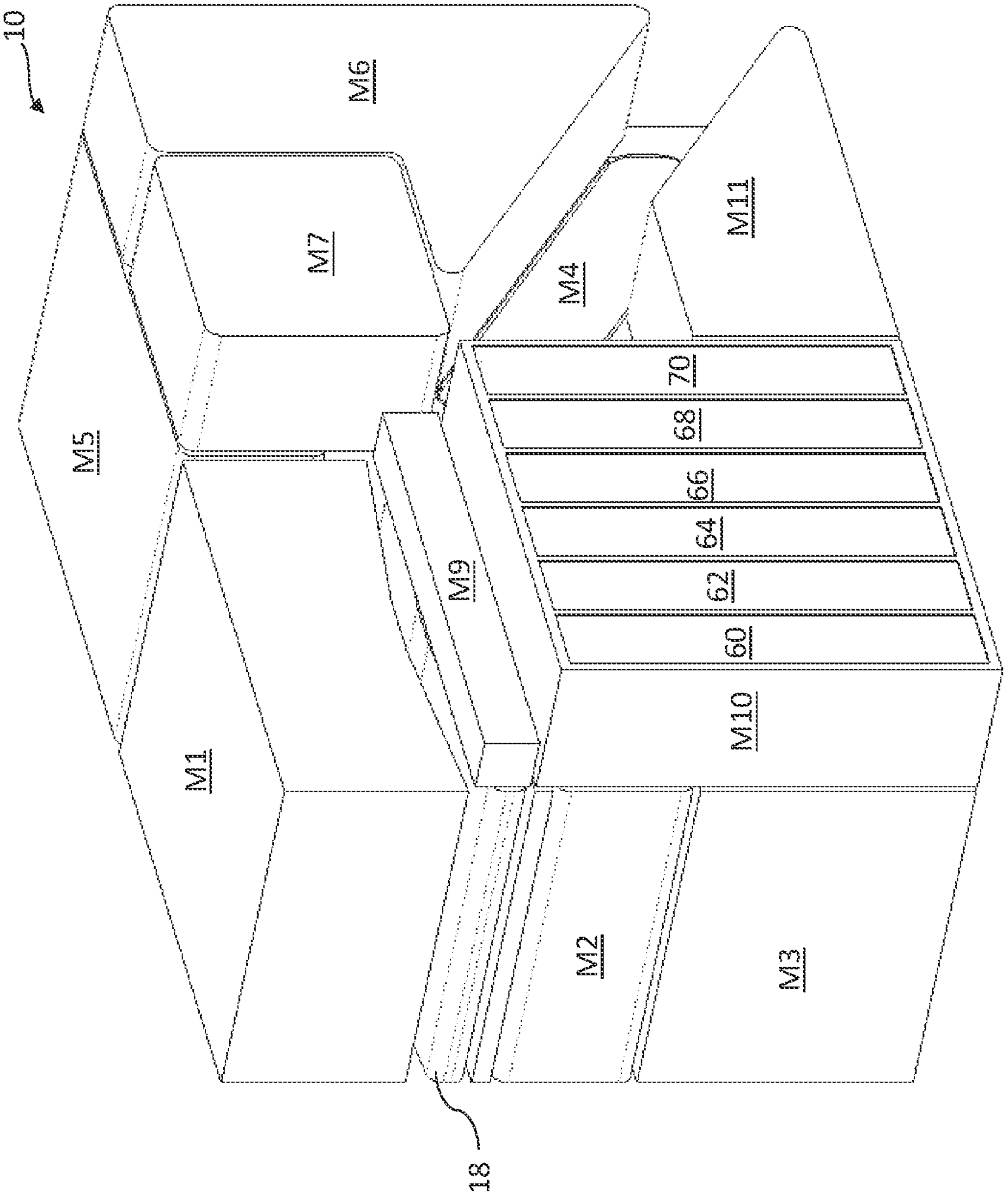
FIG. 3 is a schematic view of the modules of the inkjet printing device according to FIG. 1, from a second perspective.

FIG. 2 shows a schematic view of the structural units of the inkjet printing device 10 according to FIG. 1 from a first perspective, and according to FIG. 3 from a second perspective, wherein identical elements and/or elements having identical function have the same reference character. The drying unit used in the inkjet printing device 10 is generally designated with reference character 40, and is either the drying unit 140 or the drying unit 240.

In addition to the drying module M4, the inkjet printing device 10 comprises a printing module M1 with print bars that respectively comprise a plurality of print heads; a pulling module M2 to supply the recording medium to be printed, said recording medium being in the form of a web, to the inkjet printing device 10; a buffering module M3 to buffer a segment of the recording medium, for example given a printing interruption; an electronics module M5 with a power part to supply power to the additional modules, and preferably a control unit to control and/or monitor the electronics module M5 and/or additional modules; an air exhaust module M6; a cooling module M7 to cool the print heads of the print bars of the print module M1; a drawing module M8 to output the printed recording medium; a cleaning module M9 with cleaning elements to clean print heads of the printing module M1; a fluid management module M10 to handle the ink, the primer, and/or the residual ink, as well as the cleaning fluid; a cooling module M11 to cool the recording medium after drying; and a saddle module M12 with a transfer carriage. Upon printing in a printing operation state of the inkjet printing device 10, the recording medium is guided across the transfer carriage 18 arranged opposite the print heads, so that said transfer carriage 18 serves as a printing saddle in the printing operation mode. The design of the saddle module M12 and the function of the transfer carriage 18 will be explained in further detail in the following in conjunction with FIG. 4.

The cleaning module M9 is arranged laterally next to the saddle module M12 and comprises, as a cleaning element, at least one spraying and/or wiping element that, in a printing operation state, is arranged laterally next to the transfer carriage 18 of the saddle module M12, and thus laterally next to the printing module M1. In a maintenance operation state, the at least one spraying and/or wiping element is moved in the region below the printing module M1 in order to clean the print heads of the printing module M1 in a known manner.

The arrangement of the printing module M1 above the saddle module M12, the arrangement of the cleaning module M9 laterally next to the saddle module 12, and/or the arrangement of the fluid management module M10 below and preferably laterally next to the printing module M1, is optimal with respect to a modular design of an inkjet printing device 10 as shown in FIGS. 1 through 3. In particular, the module M10 handles fluids such as ink the regions 60 to 66, primer in the region 68, and cleaning fluid in the region 70, as well as residual ink.

The post-processing of the recording medium, in particular by the drying module M4, and/or the image acquisition of the printed image, in particular with the aid of an inline line camera, takes place spatially separate from the printing module M1 and spatially separate from the regions in which fluids are handled, such as the fluid management module M10. A simple, modular design is hereby achieved with high flexibility in the embodiment of the individual modules of the inkjet printing device 10.

Figure 4:
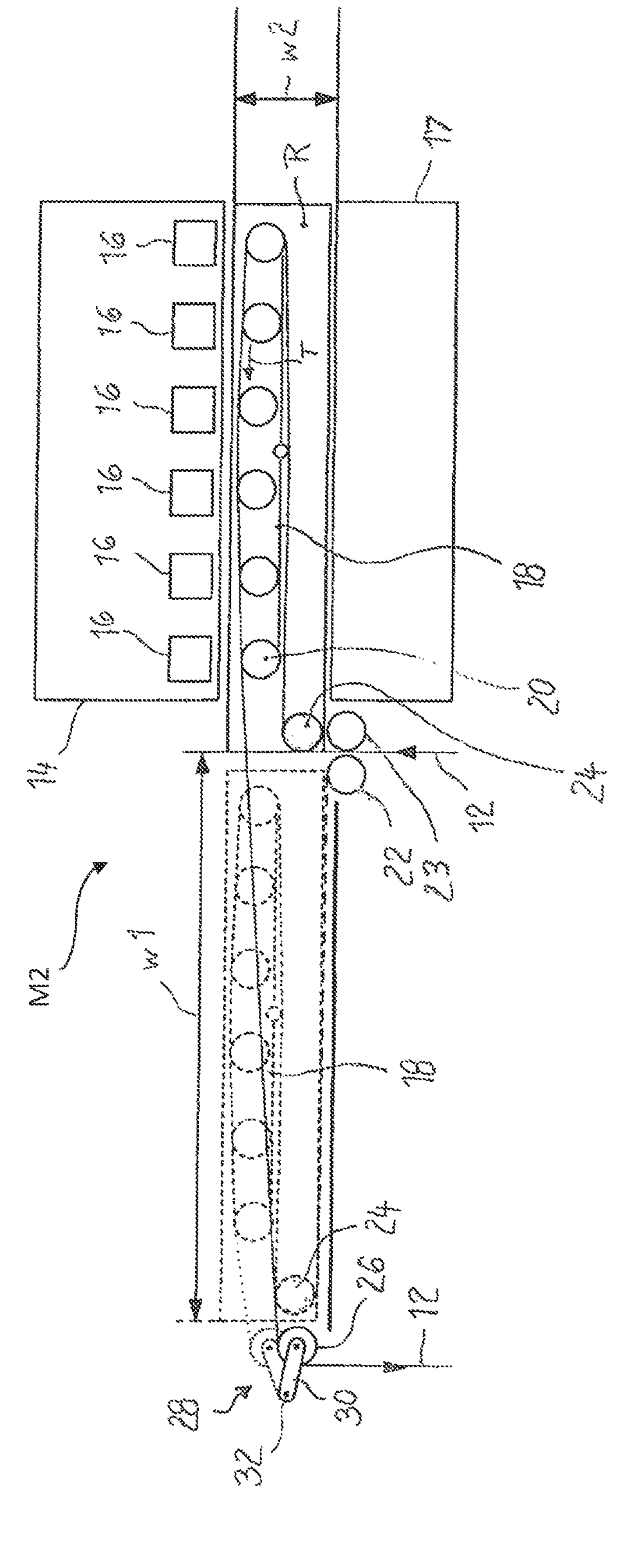
FIG. 4 is a detailed side view of modules of the inkjet printing device according to FIG. 1.

FIG. 4 shows a detailed side view of modules M1 and M12 of the inkjet printing device 10 for printing with ink to a recording medium 12 in the form of a web. The arrows at the recording medium 12 indicate its transport movement.

The printing module M1 comprises a printing unit 14 in which are arranged a plurality of print bars 16 that respectively print color separations of a primary color such as, for example, yellow, cyan, magenta, black. The print bars 16 extend over the entire width of the recording medium 12 and may have one or more print heads from whose nozzles ink droplets are ejected onto the recording medium 12. In a printing operation state, the print bars 16 are stationary and the recording medium 12 is moved forwards below the printing unit 14 along a transport direction T. Arranged below the printing unit 14 is a capture trough 17 to capture cleaning fluid and dust particles upon cleaning the print heads of the printing unit 14 in a maintenance operation state.

Arranged in a chamber R with height w2 between printing unit 14 and capture trough 17 is the transfer carriage 18 of the saddle module, which contains a plurality of cylinders 20 (only one is designated) to guide the recording medium 12. The transfer carriage 18 is borne so as to be movable. In the shown printing operation state, the transfer carriage 18 is driven into the chamber R so that the recording medium 12 is situated opposite the various print bars 16 and may be printed to with ink. In this state, the recording medium 12 forms a sling that is open to the left and is supplied to the cylinders 20 via a roller pair with rollers 22 and 23 and a deflection roller 24.

In the printing operation state, the recording medium 12 is removed via a further deflection roller 26 and supplied to subsequent modules, for example to the buffer module and/or the drying module M4.

The transfer carriage 18 is borne sliding [on], for example, guide rails (not shown) and may be displaced to the left into a maintenance position (shown in dashed lines) to set the maintenance operation state, wherein said transfer carriage 18 traverses the path w1. The deflection roller 24 is hereby moved together with the transfer carriage 18 so that the length of the sling of the recording medium 12 around the transfer carriage 18 is substantially maintained. At the left end of the sling, it is merely to be noted that a certain length difference of the sling may be created between printing operation state and maintenance operation state. This is compensated with the aid of a compensation device 28, in which the deflection roller 26 is pivoted about a pivot axis 32 and raised with the aid of a lever arm 30 in order to compensate for this length difference.

The stationary deflection roller 22 that deflects the recording medium 12 also serves for length-neutral compensation. With the aid of the compensation device 28, the movement of the transfer carriage 18 is length-neutralized overall so that the recording medium 12 experiences no position change, due to this movement, after the deflection roller 26 and before the rollers 22 and 23. The length of the sling of the recording medium 12 remains constant between the rollers 22, 23 and the deflection cylinder 26. This is very advantageous because, in this way, the recording medium 12 is supplied without length variation or position variation to a downstream drying unit 40. A duplicate drying of portions is thereby avoided. Even given a change from printing operation state into the maintenance operation state and back into the printing operation state, no length change or position change results, which leads to a continuous and uniform operating workflow. The cylinders 22, 23, 24, 20, 26 are free-wheeling in order to prevent a tearing of the recording medium 12.

Further cleaning elements (not shown) of the cleaning module M9, for example blades, wiping elements, and/or cover caps for the print bars 16, are arranged laterally next to the chamber R in the printing operation state. In the maintenance operation state, at least a portion of these cleaning elements are moved into the chamber R to clean the print heads.

In the arrangement shown in FIG. 4, the transfer carriage 18 is moved leftward in the transport direction T to set the maintenance operation state. In other embodiments, it is also possible to move the transfer carriage 18 rightward, counter to the transport direction T, to set the maintenance operation state.

All massive units and modules of the inkjet printing device 10, in particular the printing unit 14, may be permanently installed. Only a few elements need to be moved, for example cleaning elements of the cleaning unit 17 and the transfer carriage 18.

In particular given the printing unit 14, no or only small loops are required for movement compensation for various connecting lines, such as electrical lines for data transfer, sensors, actuators, optical-electrical data buses etc. and hoses for the ink supply, coolant lines etc. The connecting lines are optimally short, stationary, and can be laid without drag chain.

Via the arrangement of the transfer carriage 18 between the capture trough 17 and printing unit 14 in the printing operation state, and the arrangement of cleaning elements laterally next to the transfer carriage 18 in the printing operation state, a simple and compact design of the inkjet printing device 10 is possible, in particular the modular design of the inkjet printing device 10 as explained in conjunction with FIGS. 1 through 3.

Relatively small drives and simple guide rails are sufficient for the movement of the transfer carriage 18 and the cleaning elements. The technical expenditure, even for a possibly dragline, is comparably small for the necessary connection lines for the movable transfer carriage 18 and the movable cleaning elements.

The printing unit 14 of the printing module M1, in particular the print bars, is arranged stationary both in the printing operation state and in the maintenance operation state of the inkjet printing device 10. The electrical lines and/or fluid lines connected to the printing unit 14 may thereby also be arranged stationary in the housing 50 of the inkjet printing device 10. These electrical and/or fluid lines are not moved in the transition from the printing operation state and the maintenance operation state, and thus their position is not varied.

In the maintenance operation state, the transfer carriage 18 may be arranged partially above a drying unit 40, 140, 240 of the drying module M4 to dry the recording medium 12 printed to with the aid of the printing unit 14 of the printing module M1.

The drying module M4, in particular the drying unit 40, 140, 240, comprises a cooling unit 44 having at least one cooling element to cool the recording medium 12 after the passing of the heating element 144, 244.

As already mentioned, the drying unit 40, 140, 240 comprises at least one heating element 144, 244. An emission region 146, 246 of the heating element 144, 244 is sloped with a downward incline and/or with an upward incline in the transport direction T of the recording medium 12 so that the emission region 146, 246 intersects a horizontal plane, preferably at an angle in a range of 30° to 60°, in particular at an angle in a range from 40° to 50°.

The emission region 146, 246 of a heating element 144, 244 is generally in particular the plane in which the heating element 244 emits thermal radiation or in which a contact region is arranged for contacting a heating element 140, executed as a contact heating element 140, with the recording medium 12 to be dried. The contact region of the contact heating element 140 is preferably formed by a heating saddle across which the recording medium 12 is guided.

The emission region 146, 246 is thus arranged neither vertically nor horizontally in the transport direction T of the recording medium 12, but rather preferably in an angled plane. In the transport direction T of the recording medium 12, the start of the emission region 146, 246 has a different height than the end of the emission region 146, 246.

For drying, at least in the region of the heating element 144, 244, the recording medium 12 is moved along the emission region 146, 246 of said heating element 144, 244 or parallel to its emission region 146, 246.

It is particularly advantageous if the heating element 144, 244 is a first heating element 144, 244 with a first emission region 146, 246, and if the drying unit 40, 140, 240 comprises at least one second heating element 144, 244 having a second emission region 146, 246. The first emission region 146, 246 may thereby be arranged on a front side of the drying unit 40, 140, 240, and the second emission region 146, 246 may be arranged on a back side of the drying unit 40, 140, 240. The recording medium 12 may then first be directed past the front side of the drying unit 40, 140, 240, preferably at a downward angle, and subsequently past the back side of the drying unit 40, 140, 240, preferably at an upward angle.

The emission region 146, 246, or the first emission region 146, 246 and/or second emission region 146, 246 of the drying unit 40, 140, 240 may travel along or parallel to a diagonal of the drying module M4.

Alternatively or additionally, it is particularly advantageous if the at least one heating element 144, 244 is arranged at the front side and the at least one cooling element is arranged at the back side of the drying unit 40, 140, 240, wherein the recording medium 12 is first directed past the front side of the drying unit 40, 140, 240, preferably at a downward angle, and subsequently past the back side of the drying unit 40, 140, 240, preferably at an upward angle.

Additionally, or as an alternative to the cooling element, a cooling cylinder may be arranged in the drying module M4, across which cooling cylinder the recording medium 12 is directed after passing the heating element 144, 244.

A suction arrangement or a suction channel 46 to draw off air from the region of the drying unit 40 may be arranged above the at least one heating element 144, 244, or laterally offset above the at least one heating element 144, 244 of the drying unit 40, 140, 240.

Figure 5:
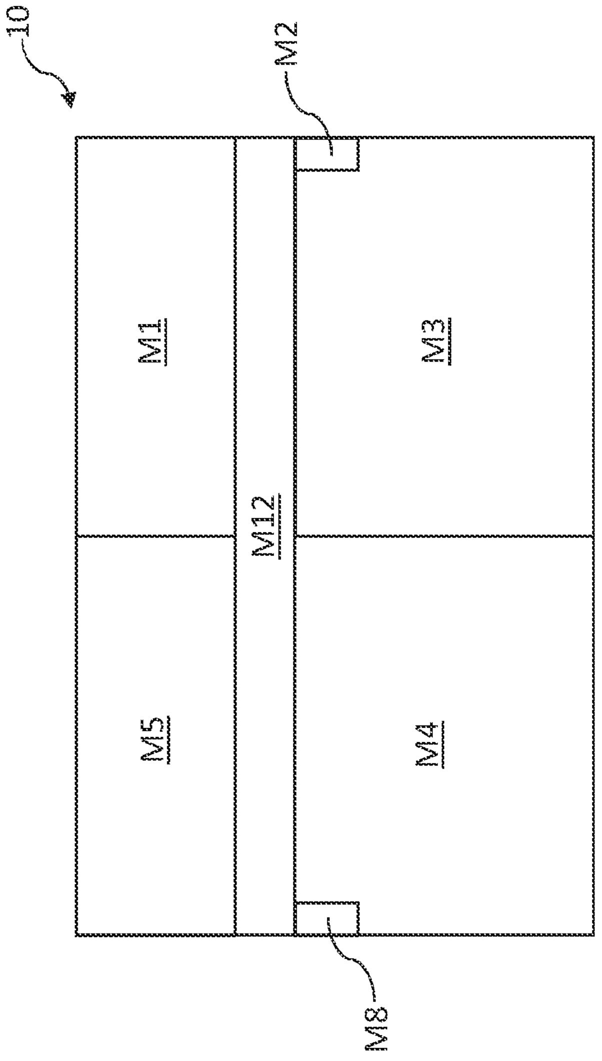
FIG. 5 is a simplified, schematic arrangement of modules of an inkjet printing device of a further embodiment.

FIG. 5 shows a simplified, schematic arrangement of M1, M2, M3, M4, M5, M8, and M12 of the inkjet printing device 10 that are arranged in the transport plane of the recording medium 12. The further modules M6, M7, M9, M10, M11 shown in FIGS. 1 through 4 may be arranged in other embodiments and at different locations than those indicated there, or be integrated into other modules. The recording medium 12 is directed through each of the modules M1, M2, M3, M4, M5, M8, and M12. These modules thus define a recording medium plane.

In other embodiments, the module M2 may be arranged externally or be integrated into the module M3. Alternatively or additionally, in other embodiments the module M8 may be arranged externally or be integrated into the module M4. The capture trough 17 may be arranged in the module M3, as shown in FIGS. 2 and 4, or be arranged in module M12 in other embodiments.

In spite of modular separation of the functions of the inkjet printing device 10, a lesser space requirement in both the height and in the base area, what is known as the footprint, of the inkjet printing device 10 is necessary via the arrangement of the modules M1, M2, M3, M4, M5, M8, and M12 as shown in FIG. 5. In particular, a development of the inkjet printing device 10 and/or a change of the configuration of the inkjet printing device may be achieved simply by exchanging entire modules M1 through M12, or exchanging units 14, 18, 140, 240 of individual modules M1 through M12.

REFERENCE LIST

10 inkjet printing device
12 recording medium
14 printing unit
16 print bar
17 capture trough
18 transfer carriage
20 cylinders
22, 23, rollers
24 deflection roller
26 deflection roller
28 compensation device
30 lever arm
32 pivot axis
40, 140, 240 drying unit
42 inline scanner
44 cooling and deflection cylinder
46 suction channel
50 housing
60, 62, 64, 66 inking unit
68 primer unit
70 purge fluid unit
142, 242 transport carriage
144, 244 heating element
146, 246 emission region
T transport direction
WP1 maintenance positions
w1 path
w2 height
M1 printing module
M2 pulling module, input
M3 buffer module
M4 drying module
M5 electronics module
M6 air suction module
M7 cooling module, print heads
M8 pulling module, output
M9 cleaning module with wiper unit
M10 fluid management module
M11 cooling module, drying
M12 saddle module with transfer carriage

The invention claimed is:

1. A drying unit for a printing device for printing with ink to a recording medium in the form of a web, the drying unit comprising:

at least one heating element, wherein the recording medium to be dried is movable along an emission region of the at least one heating element, wherein the emission region is arranged angled in a transport direction of the recording medium, and wherein the drying unit is configured as a modular exchangeable unit such that the drying unit can be removed from the printing device and inserted into a different printing device.

2. The drying unit according to claim 1, wherein the emission region is inclined at a downward angle and/or at an upward angle in the transport direction of the recording medium.

3. The drying unit according to claim 1, wherein, at least in a region of a respective at least one heating element, the recording medium is movable along the emission region of said respective heating element or parallel to the emission region of said respective heating element.

4. The drying unit according to claim 1, wherein the emission region is configured to be arranged along or parallel to a diagonal of a drying module in which the drying unit is configured to be placed.

5. The drying unit according to claim 1, wherein the emission region intersects a horizontal plane at an angle in a range from 30° to 60°.

6. The drying unit according to claim 5, wherein the emission region intersects a horizontal plane at an angle in a range from 40° to 50°.

7. The drying unit according to claim 1, wherein the drying unit is a first drying unit, wherein the at least one heating element of the first drying unit is an IR radiant heating element; wherein a second drying unit having at least one second heating element is present; wherein the second heating element of the second drying unit is a contact heating element having a heating saddle across which the recording medium is guided; wherein the first and second drying units are configured such that the first and second drying units can be exchanged with one another by an operator.

8. The drying unit according to claim 1, further comprising at least one cooling arrangement having at least one cooling element to cool the recording medium after passing the at least one heating element.

9. The drying unit according to claim 8, wherein the at least one heating element is arranged on a front side of the drying unit and the cooling arrangement is arranged on a back side of the drying unit, wherein the recording medium is first directed past the front side of the drying unit at a downward angle and subsequently past the back side of the drying unit at an upward angle.

10. The drying unit according to claim 8, wherein the cooling arrangement comprises a cooling cylinder across which the recording medium is guided after passing the at least one heating element.

11. The drying unit according to claim 1, wherein guidance of the recording medium takes place after an infeed position at which the recording medium enters into the drying unit, at a downward angle parallel to the emission region of the at least one heating element.

12. The drying unit according to claim 1, further comprising a suction arrangement to draw off air from a region of the at least one heating element that is arranged above the at least one heating element, or laterally offset above the at least one heating element.

13. An inkjet printing device for printing with ink to a recording medium in the form of a web, comprising:

a drying unit according to claim 1, a printing unit with a plurality of print bars that respectively have one or more print heads, a transfer carriage configured to be moved into and out of a chamber below the printing unit, to guide the recording medium, wherein, in a printing operation state, the transfer carriage is arranged in a chamber and guides the recording medium for printing, wherein, in a maintenance operation state, the transfer carriage is moved out of the chamber and is arranged at least partially above the drying unit.

14. The inkjet printing device according to claim 13, wherein the recording medium is moved together with the transfer carriage given a movement of the transfer carriage from the printing operation state into the maintenance operation state, and from the maintenance operation state into the printing operation state, and/or wherein at least a portion of cleaning elements of a cleaning unit is arranged laterally next to the chamber in the printing operation state, and in said chamber in the maintenance operation state, in the transport direction of the recording medium.

15. A drying unit for a printing device for printing with ink to a recording medium in the form of a web, the drying unit comprising:

a first heating element having a first emission region; and at least one second heating element having a second emission region, wherein the recording medium to be dried is movable along the first emission region of the first heating element and along the second emission region of the at least one second heating element, wherein the first emission region is arranged at a front side of the drying unit and the second emission region is arranged at a back side of the drying unit, wherein the recording medium is configured to be first directed past the front side of the drying unit, and subsequently past the back side of the drying unit at an upward angle, and wherein the drying unit is configured as a modular exchangeable unit such that the drying unit can be removed from the printing device and inserted into a different printing device.

16. The drying unit of claim 15, wherein the recording medium is configured to be first directed past the front side of the drying unit at a downward angle, and subsequently past the back side of the drying unit at an upward angle.

17. The drying unit according to claim 15, wherein the first emission region and/or the second emission region, is configured to be arranged along or parallel to a diagonal of a drying module in which the drying unit is configured to be placed.

18. The drying unit according to claim 15, wherein the first emission region and/or the second emission region intersects a horizontal plane at an angle in a range from 30° to 60°.

19. An inkjet printing device for printing with ink to a recording medium in the form of a web, comprising:

a drying unit according to claim 15, a printing unit with a plurality of print bars that respectively have one or more print heads, a transfer carriage configured to be moved into and out of a chamber below the printing unit, to guide the recording medium, wherein, in a printing operation state, the transfer carriage is arranged in a chamber and guides the recording medium for printing, wherein, in a maintenance operation state, the transfer carriage is moved out of the chamber and is arranged at least partially above the drying unit.

* * * * *